(12) United States Patent
Huber et al.

(10) Patent No.: US 8,182,186 B2
(45) Date of Patent: *May 22, 2012

(54) SCREW

(75) Inventors: Franz Huber, Markt Wald (DE); Simon Oppeneiger, Hoechst (AT)

(73) Assignee: Hilti Aktiengesellschaft, Schaan (LI)

( * ) Notice: Subject to any disclaimer, the term of this patent is extended or adjusted under 35 U.S.C. 154(b) by 279 days.

This patent is subject to a terminal disclaimer.

(21) Appl. No.: 12/290,443

(22) Filed: Oct. 29, 2008

(65) Prior Publication Data

US 2009/0110514 A1 Apr. 30, 2009

(30) Foreign Application Priority Data

Oct. 31, 2007 (DE) .......................... 10 2007 000 606

(51) Int. Cl.
*F16B 25/00* (2006.01)

(52) U.S. Cl. .................... 411/386; 411/387.5; 411/411; 411/417

(58) Field of Classification Search .................. 411/386, 411/417, 418, 311, 387.1–387.8, 411; 408/218; 470/10

See application file for complete search history.

(56) References Cited

U.S. PATENT DOCUMENTS

| | | | | |
|---|---|---|---|---|
| 1,933,332 A * | 10/1933 | May | ............................. | 411/418 |
| 3,426,642 A * | 2/1969 | Phipardvey, Jr. | ............. | 411/417 |
| 4,637,767 A * | 1/1987 | Yaotani et al. | ................ | 411/411 |
| 5,385,439 A * | 1/1995 | Hurdle | .......................... | 411/386 |
| 5,827,030 A * | 10/1998 | Dicke | ......................... | 411/387.4 |
| 6,086,302 A * | 7/2000 | Gerhard | ..................... | 411/387.4 |
| 7,740,435 B2 * | 6/2010 | Gstach et al. | ................. | 411/386 |
| 7,780,388 B2 * | 8/2010 | Yamaki | ......................... | 411/386 |
| 2006/0120826 A1 * | 6/2006 | Wieser et al. | .............. | 411/387.4 |
| 2006/0193713 A1 | 8/2006 | Gerhard | | |
| 2010/0061824 A1 * | 3/2010 | Lin | ............................ | 411/387.5 |

* cited by examiner

*Primary Examiner* — Victor Batson
*Assistant Examiner* — Roberta Delisle
(74) *Attorney, Agent, or Firm* — Abelman, Frayne & Schwab

(57) ABSTRACT

A screw (11) has a shaft (12), a thread (13) which is arranged in at least some areas over the circumference of the shaft (12) and which defines a helix (14), and cutting bodies (26; 36; 46; 56, 66) made of a material having hardness greater than the hardness of the thread (13) and arranged in recesses (20, 21) of the thread (13), with the cutting bodies (26; 36; 46; 56, 66) having their longitudinal extension oriented along the helix (14) so that their longitudinal axes (27; 37; 47; 57, 67) enclose an angle (A; B; C; D, E) of −35° to +35° with the respective tangents of the helix (14).

4 Claims, 2 Drawing Sheets

SCREW

BACKGROUND OF THE INVENTION

1. Field of the Invention

The invention relates to a screw having a shaft and a thread which is arranged in at least some areas over the circumference of the shaft and which defines a helix, and with cutting bodies of a material, hardness of which is greater than the hardness of the thread, being arranged in recesses formed in the thread.

2. Description of the Prior Art

Screws of the type mentioned above are screwed directly into a borehole that has been prepared beforehand in a substrate, with the thread of the screw cutting a complementary thread or an undercut in the substrate.

For outdoor applications, screws such as concrete screws are advantageously made of a corrosion-resistant material, e.g., corrosion-resistant steels. However, materials such as these often have an insufficient hardness for cutting into a mineral substrate so that, e.g., screw threads which are formed integral with the shaft become worn when the screw is screwed in. A hardening of the screw or of the thread is only possible under certain conditions with corrosion-resistant materials.

German Publication DE 198 52 338 A1 discloses a screw of stainless steel the shaft of which and the thread are provided with receiving boreholes which open outward for receiving cutting bodies in form of cylindrical pin-shaped cutting inserts of hardened steel which make it easier to cut into a hard, mineral substrate such as concrete or masonry. The pin-shaped cutting inserts extend longitudinally and are arranged in the receiving boreholes in such a way that their longitudinal axes extend radially outward. The pin-shaped cutting inserts are held in the receiving boreholes in the shaft formlockingly in the screw-in direction and frictionally in radial direction.

The known solution is disadvantageous in that the pin-shaped cutting inserts extend beyond the cross-sectional projection surface of the thread by the same amount, and manufacture of this screw is very complicated because the large number of pin-shaped cutting inserts must be finished individually. Further, the cylindrical pin-shaped cutting inserts project beyond the cross-sectional projection surface of the thread in such a way that the produced undercut is too large for the thread that follows, particularly in a mineral substrate because of its inhomogeneity, which decreases the load level of the screw. Further, the pin-shaped cutting inserts according to DE 198 52 338 A1 generate a high screw-in resistance which makes it difficult or even impossible to screw in the thread-tapping screw without problems, particularly with screws having a small diameter.

SUMMARY OF THE INVENTION

It is the object of the invention to provide a thread-tapping screw which improves the driving of the screw in hard substrates such as, e.g., concrete, and which is simple to manufacture.

This and other objects of the present invention, which will become apparent hereinafter, are achieved by providing, according to the invention, cutting bodies oriented with their longitudinal extension along the helix in such a way that their longitudinal axes encloses an angle with the respective tangents of the helix different from 0°. The angle between a respective longitudinal axis of a cutting body and a respective tangent of the helix can vary in a range from −35° to +35°.

Because of the angular arrangement of the cutting bodies, pressure peaks on the cutting bodies, which project beyond the cross-sectional projection surface of the thread at least in some areas, are drastically reduced, which ensures an advantageous forming of the undercut or counter-thread in the substrate. The pressure peaks at the cutting bodies, which locally exceed the pressure resistance of the mineral substrate, lead to a locally limited destruction of the substrate. As a result, the removal of substrate material is increased in such a way that the thread, which engages in the generated undercut, can transmit only a limited load, if any, in this area. For mineral substrates, the enclosed angle of the longitudinal axis of the cutting bodies with the respective tangent of the helix is advantageously −20° to +20°.

Further, because of the angular arrangement of the cutting bodies, the substrate material to be removed is removed in the manner of a snow plow. This "snow plow effect" forces the removed substrate material in direction of the outer diameter of the shaft so as to reduce the energy expended for screwing in the screw. Further, this leads to an improved compaction of drillings between the outer diameter of the shaft and the borehole wall so that the load capacity of the screw is increased compared to a prior art screw.

Mineral substrates such as concrete have reinforcement iron that may lie in the area of the borehole. The angular arrangement of the hard cutting bodies guarantees that the screw will advance even when encountering reinforcement iron.

The cutting bodies are advantageously formed of a hard metal and are further advantageously welded into the thread, for example, by resistance welding.

Apart from the improved screw-in behavior when encountering reinforcement iron, the screw according to the invention also has reduced screw-in torque, a shorter screw-in time, and a higher screw-in probability compared to screws of the prior art even with smaller borehole dimensions.

The cutting bodies are preferably arranged at an inclination to the respective tangent of the helix within a plane enclosed by the helix so that the cutting body projects at least partially over the shape of the radial outer contour or over the cross-sectional projection surface of the thread. By a "positive inclination" is meant, in this case, an inclination of the longitudinal axis of the cutting body facing the outer diameter of the shaft with respect to the direction of the helix starting from the thread pilot. Correspondingly, a "negative inclination" is an inclination of the longitudinal axis of the cutting body directed away from the outer diameter of the shaft with respect to the direction of the helix starting from the thread pilot.

The cutting bodies are preferably arranged at an inclination to the respective tangent of the helix transverse to a plane enclosed by the helix, so that the cutting body projects at least partially laterally over the cross-sectional projection surface of the thread. By a "positive inclination" is meant in this case an inclination of the longitudinal axis of the cutting body transverse to the helix with respect to the longitudinal extension of the at least one flank of the thread away from the thread pilot. In a corresponding manner, a "negative inclination" is an inclination of the longitudinal axis of the cutting body transverse to the helix with respect to the longitudinal extension of the at least one flank of the thread toward the thread pilot.

The cutting bodies are advantageously arranged at an inclination to the respective tangent of the helix within, and transverse the plane enclosed by the helix.

In an advantageous manner, cutting bodies are arranged next to one another along the thread at an inclination so as to enclose different angles. In addition to an arrangement of the cutting bodies in which all of the cutting bodies are provided at the same angle and in the same orientation, the cutting bodies can also advantageously be arranged in such a way that successive cutting bodies are oriented at an inclination to the respective tangent of the helix differently, particularly transverse to the plane enclosed by the helix. The different orientations of the cutting bodies results in a twisting of the cutting edges or cutting surfaces of the cutting bodies, which ensures an advantageous removal of substrate material in the borehole and, therefore, an advantageous undercut. In an advantageous manner, the differently oriented cutting bodies arranged next to one another are arranged in an alternating manner, which ensures an advantageous cutting behavior of the area of the thread outfitted with the cutting bodies.

The novel features of the present invention which are considered as characteristic for the invention are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

In principle, identical parts are provided with identical reference numerals in the drawings.

DETAILED DESCRIPTION OF THE PREFERRED EMBODIMENT

Figure 1:
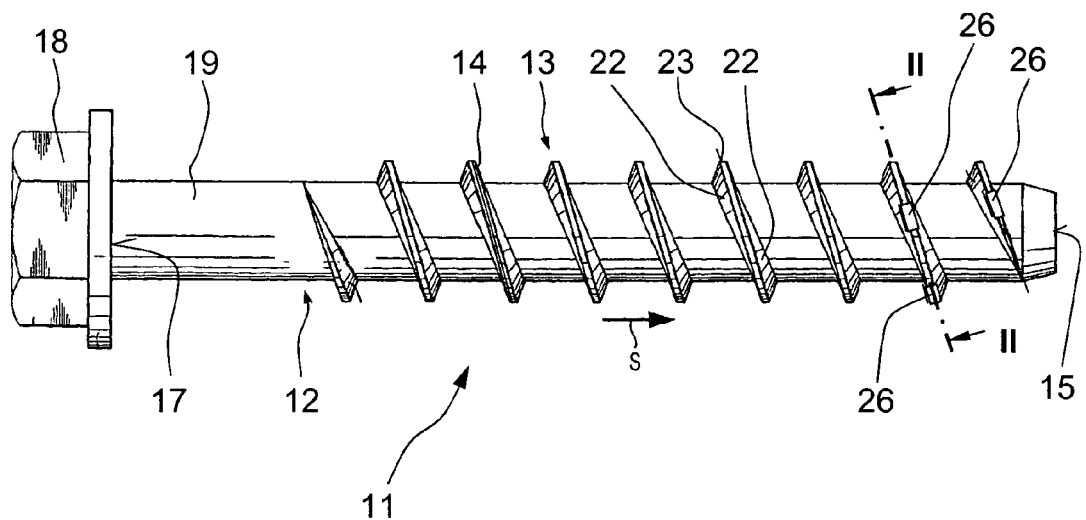
FIG. 1 a side view of a screw.
Figure 2A:
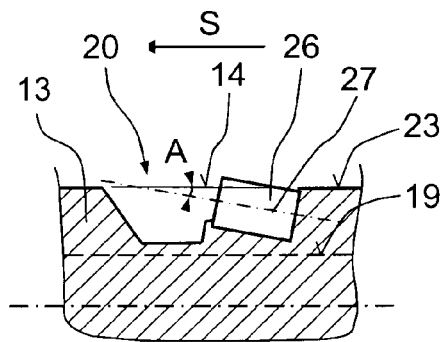
FIGS. 2A-2C three different orientations of a cutting body in partial section along line II-II in FIG. 1.
Figure 3A:
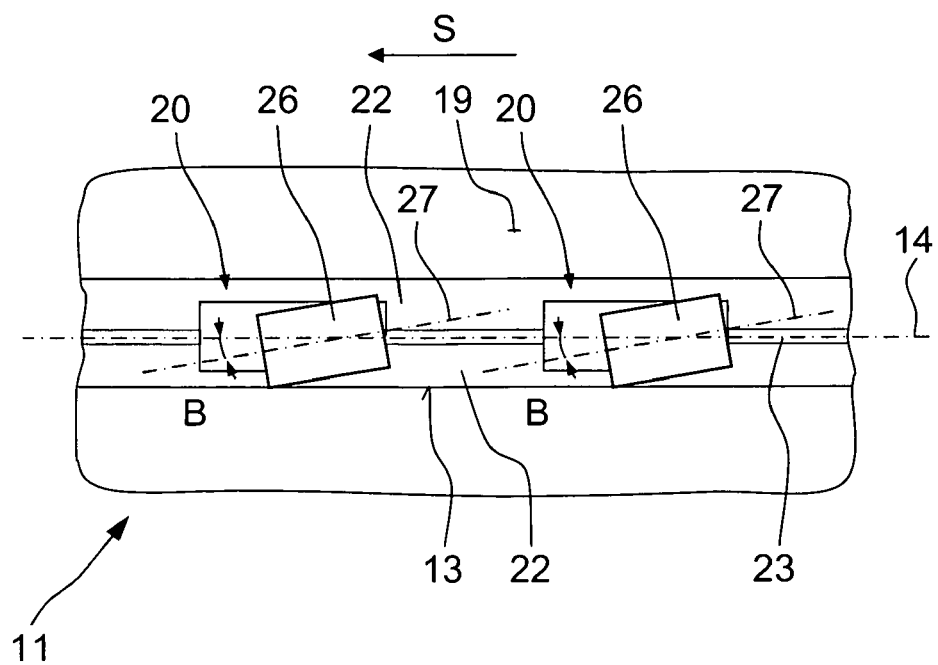
FIGS. 3A-B two different orientations of two cutting bodies, respectively, in a plan view of the thread.

The screw 11 shown in FIGS. 1, 2A and 3A has a shaft 12 and a thread 13 which is formed integrally with the shaft 12 and arranged in at least some areas of the circumference of this shaft 12. The thread 13 defines a helix 14 and has a radial outer contour 23 and two lateral flanks 22. The thread 13 extends from a free end 15 of the shaft 12 from a thread pilot 16 over an area of the shaft 12 in direction of a second end 17 of the shaft 12 at which a hexagon screw head is provided as screw driving means 18. The arrow S in the drawings indicates the screw-in direction of the screw 11.

A plurality of cylindrical cutting bodies 26 which are made of a material the hardness of which is greater than the hardness of the thread 13, are arranged in recesses 20 of the thread 13. The recesses 20 extend from the radial outer contour 23 of the thread 13 in direction of the outer side 19 of the shaft 12 without penetrating into the shaft 12. The cut-out 20 forms a space for drill dust and drill chips in front of the cutting body 26 viewed in direction of the thread pilot 16. The cutting bodies 26 with their longitudinal extension oriented along the helix 14, are oriented in such a way that their longitudinal axes 27 enclose an angle of −35° to +35° with the respective tangent of the helix 14. As is shown in FIG. 2A, the longitudinal axis 27 of the cutting body 26 encloses an angle A of +15° with the respective tangent of the helix 14, within a plane enclosed by the helix 14 and an angle B of +20° with the respective tangent of the helix 14 transverse to the plane enclosed by the helix 14. As is shown particularly in FIG. 3A, the cutting bodies 26 are all oriented identically and in direction of the pilot 16 of the thread 13 in the plan view of the thread 13.

Figure 2B:
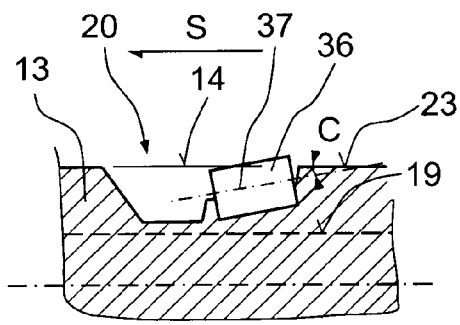

In the variant of the arrangement of a cutting body 36 shown in FIG. 2B, the cutting body 36 is inclined in the opposite direction with respect to cutting body 26, and the longitudinal axis 27 of the cutting body 26 encloses an angle C of −20° with the respective tangent of the helix 14 within a plane enclosed by the helix 14. The cut-out 20 forms a space for removed drill dust in front of the cutting body 36 viewed in direction of the thread pilot 16.

Figure 2C:
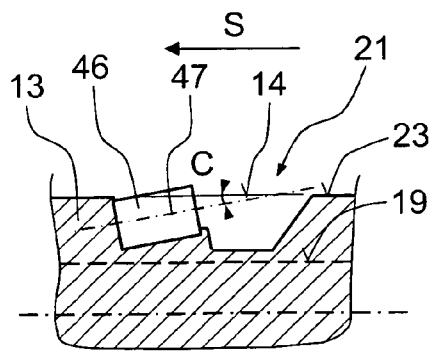

In the variant of the arrangement of a cutting body 46 shown in FIG. 2C, this cutting body 46 is oriented in the same way as the cutting body 36 in FIG. 2B, and the space formed by the cut-out 21 for drill dust extends behind the cutting body 46 viewed in direction of the pilot 16 of the thread.

Figure 3B:
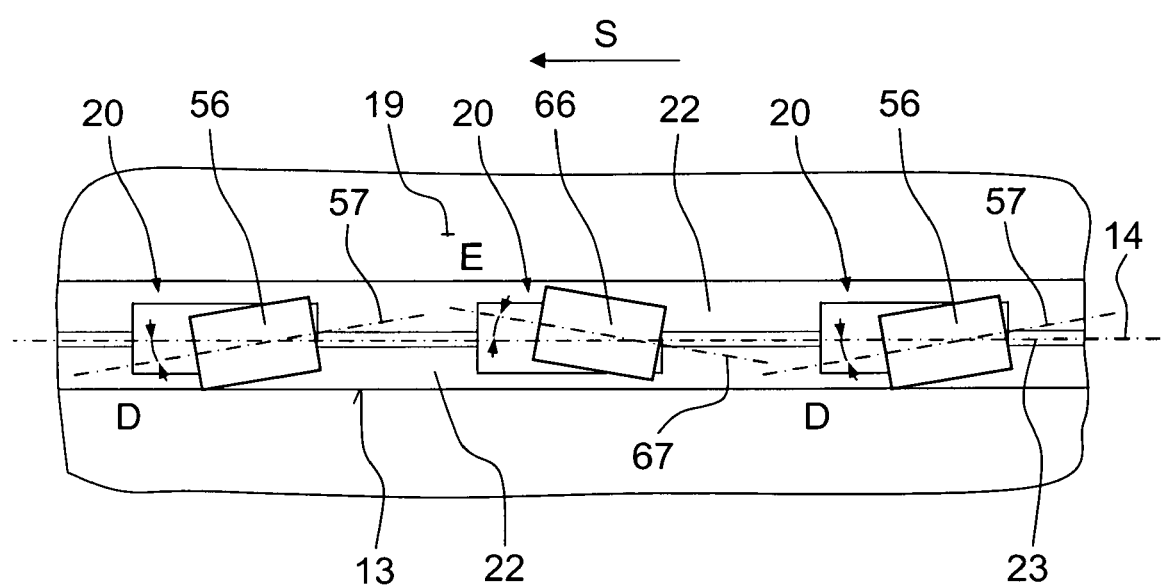

FIG. 3B shows the cutting bodies 56 and 66 which arranged next to one another along the thread 13 at an inclination enclosing different angles D and E for creating a twist in the thread. The cutting body 56 has a longitudinal axis 57 which encloses an angle D of +20° with the respective tangent of the helix 14 transverse to the plane enclosed by the helix 14. The longitudinal axis 67 of the cutting body 66 encloses an angle E of −15° with the respective tangent of the helix 14 transverse to the plane enclosed by the helix 14.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A screw (11), comprising a shaft (12); a thread (13) arranged at least in some areas over a circumference of the shaft (12) and defining a helix (14), and elongate cutting bodies (26; 36; 46; 56; 66) made of a material having a hardness greater than the hardness of the thread (13), the thread (13) having a plurality of recesses (20, 21) for receiving the elongate cutting bodies (26; 36; 46; 56; 66) and oriented along the helix (14), and the elongate cutting bodies (26; 36; 46; 56; 66) being inclined along a longitudinal extent thereof relative to respective tangents of the helix (14) so that longitudinal axes (27; 37; 47; 57; 67) of the elongate cutting bodies (26; 36; 46; 56; 66) form with the respective tangents of the helix (14) an angle (A; B; C; D) different from 0°.

2. A screw according to claim 1, wherein the cutting bodies (56, 66) are arranged next to one another along the thread (13) are inclined relative to the respective tangents of the helix (14) at different degrees so that the respective longitudinal axes (57, 67) enclosed with the respective tangents different angles (D, E).

3. A screw according to claim 1, wherein the angle between a respective longitudinal axis of a cutting body and a respective tangent of the helix varies in a range from −35° to +35°, excluding 0°.

4. A screw according to claim 1, wherein the elongate cutting bodies are formed as cylindrical cutting bodies.

* * * * *